July 25, 1939.　　　H. G. KLEMM　　　2,167,577
MOUNTING
Filed Jan. 30, 1937　　　2 Sheets-Sheet 1
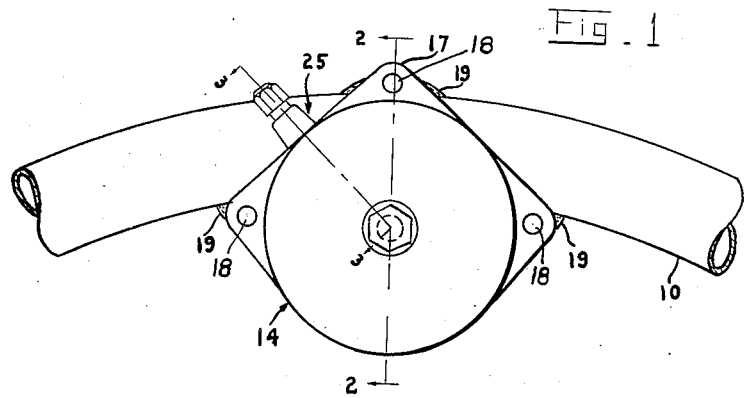
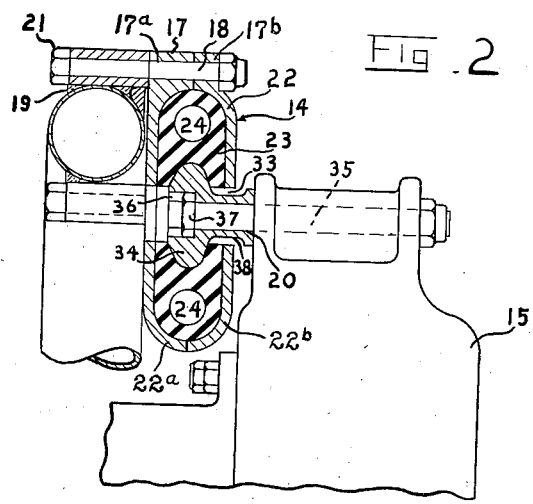
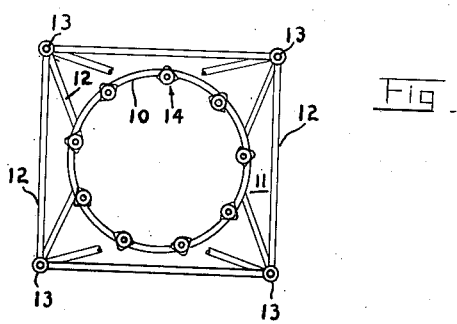
INVENTOR.
HERMAN G. KLEMM
BY
ATTORNEY.

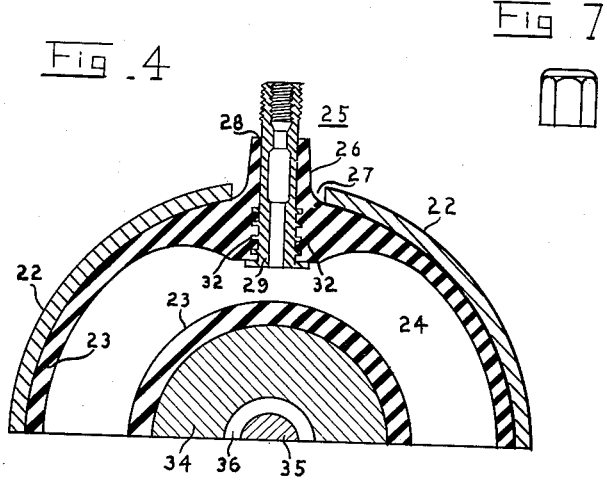
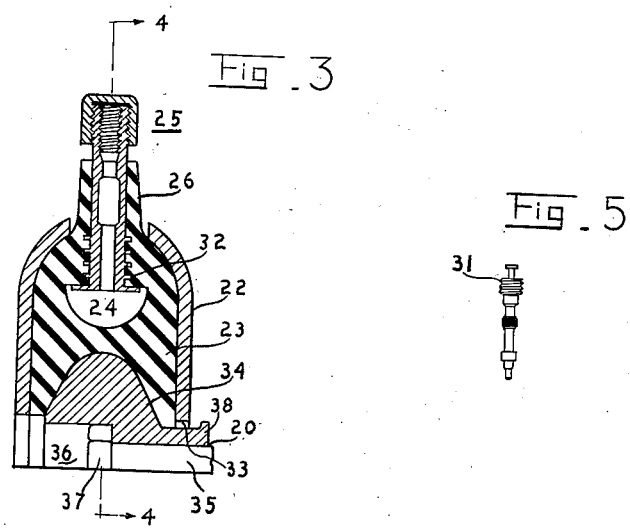

Patented July 25, 1939

2,167,577

UNITED STATES PATENT OFFICE 2,167,577

MOUNTING

Herman G. Klemm, Baltimore, Md., assignor to
The Glenn L. Martin Company, Baltimore, Md.

Application January 30, 1937, Serial No. 123,093

2 Claims. (Cl. 248—5)

This invention relates to a novel mounting and more particularly to an improved means for connecting one member to another in such a manner as to quench and absorb vibrations set up by either, or both, of such members.

Various types of mountings have heretofore been proposed for flexibly mounting one member to another in such a manner as to absorb, or at least reduce, the vibrations, shocks, and the like set up by one member from being transferred to an associated supporting member. Some of these proposed mountings have been more or less successful for some installations. However, such installations, as the mounting of an aircraft engine on an aircraft supporting structure, such as an aircraft wing or fuselage, present an individual problem due to the fact that an aircraft engine produces a plurality of forces in several different directions. As for instance, an aircraft engine mounted on an aircraft supporting structure should be mounted not only to take care of the weight of the engine, which is downward, but inasmuch as the propeller which draws the craft through the air or over the ground is usually fixed directly to the engine crankshaft, it follows that the engine mounting must also take care of the propelling force, or thrust, of drawing the craft forward, which force imposes a forward force on the means connecting the engine with the supporting structure of the craft. Also, this same supporting means must take care of other forces, such as the well known engine torque, which is set up by the rotation of the propeller and tends to cause the engine to rotate about its crankshaft in a direction opposite to the rotation of the propeller being driven by the engine. These several forces vary according to different installations.

The mounting of an aircraft engine onto an aircraft supporting structure presents a different problem from mounting an engine on a stationary structure due to the fact that the aircraft structure itself sets up considerable vibration due to its passage through the air as well as the shifting of the load or varying of the load from one point to another on the supporting surfaces of the craft as well as the irregularity of the air, generally referred to as "airpockets" or "bumps". Therefore, in this particular installation of an aircraft engine on an aircraft supporting structure, we have the problem of mounting one vibrating member onto another vibrating member and in order to properly do this the means employed for mounting these two vibrating members should be adjustable in a manner that will prevent the harmonizing of the vibrations of one member with the vibrations of another as well as to be adjustable to the extent of maintaining an efficient vibrational frequency differential between the two vibrating members.

It is one object of this invention to provide a novel mounting for connecting one member to another member.

Another object is to provide a novel mounting for connecting one member to another member that shall operate to reduce or eliminate the transmitting of vibrations set up by either of such members to the other member.

Another object is to provide a novel means for connecting one vibrating member to another vibrating member that shall be adjustable to maintain a frequency differential between the vibrations of the two members.

Another object is to provide an improved means for connecting an aircraft engine to an aircraft supporting structure that shall prevent the most part of the vibrations set up by the engine in operation from being transmitted to the engine supporting structure.

Another object is to provide improved means for connecting or mounting an aircraft engine on an aircraft supporting structure that shall operate to efficiently take care of the several different forces imposed upon the supporting structure of an aircraft engine.

A further object is to provide an improved mounting for an aircraft engine that shall consist of a plurality of elements adapted to engage and cooperate with separate locations of an engine structure in such a manner as to render different flexibility or resiliency at each of the locations.

A still further object is to provide novel means for mounting an aircraft engine on an aircraft supporting structure that shall consist of a plurality of interchangeable elements and each of said elements shall be independently adjustable for rendering predetermined degrees of flexibility or resiliency.

The above and other objects will be made apparent throughout the further description of the invention when taken in connection with the accompanying drawings, wherein like reference characters refer to like parts. It is to be distinctly understood that the drawings are not a definition of the invention, but merely illustrate a preferred embodiment of the invention in connection with one particular type of installation. While the invention is here described in connection with the mounting of an aircraft engine on a supporting structure of an aircraft, it will be understood that the present invention is equally adaptable for any installation where flexibility and resiliency are required between the cooperating structures to be connected together, such as the mounting of an automobile engine on a supporting structure of such automobile, or any other installation where it is desired to prevent the transmittal of the vibrations of one member to another member, such as a stationary structure.

In the drawings:

Figure 1 is a front elevation view of a mounting embodying the invention shown in fixed relation to a fragmentary part of an engine bearer.

Figure 2 is a sectional view taken along the line 2—2 of Figure 1 showing the present mounting connected in operable relation with a fragmentary part of an engine crankcase.

Figure 3 is an enlarged sectional view taken along the line 3—3 of Figure 1.

Figure 4 is a sectional view taken along the line 4—4 of Figure 3.

Figure 5 is a detail view of a valve employed with the invention.

Figure 6 is a diagrammatic view showing one manner in which a plurality of the present mountings may be positioned about an engine bearer for connecting and supporting an aircraft engine, and Figure 7 is a detail view of a valve cover employed with the invention.

Referring to the drawings, 10 indicates the forward circular member of the framework of an engine bearer represented in its entirety by 11. The engine bearer is preferably constructed of pipe connections 12, the latter being made of steel, a selected material, such as duralumin or aluminum, and providing rear or base connections 13 for connecting the engine bearer 11 to the supporting structure of an aircraft, such as the forward beam of an aircraft wing or the fuselage.

In the form shown, the present mounting is indicated in its entirety by 14 and is employed for connecting the aircraft engine indicated at 15 to the forward ring member 10 of the engine bearer 11. However, it may be well to point out here that the present mounting 14 is equally adaptable for connecting the engine bearer 11 to the aircraft supporting structure at the points 13.

The fragmentary part of the aircraft engine 15 here illustrated may be one of a number of feet or projections provided on the crankcase of a radial type engine, and it can be understood from Figure 6 that the engine 15 is connected to the ring member 10 of the engine bearer 11 at a plurality of predetermined points, the purpose of which will be understood as the description of the invention progresses.

Inasmuch as the present mountings are identical and interchangeable, it is only necessary to describe the mechanism and function of one of the mountings or connecting means. In this embodiment the mounting 14 is provided with ears or projections 17, each of which have a lateral opening therethrough for receiving a connecting member, such as bolts 18, while the ring member 10 is provided with cooperating projections or ears 19 having cooperating lateral openings therethrough for receiving the corresponding portion of the bolts 18. The bolts 18 are provided with suitable lock nuts 21, whereby the cooperating ears 17 and 19 may be clamped into rigid fixed relation.

The body of the connecting means consists of a housing 22 substantially enclosing a flexible pneumatic member 23. Housing 22 may be of any desirable shape and may consist of two shells 22a and 22b which have ears 17a and 17b, respectively. These ears, and consequently the shells, are held together by the bolts 18, this being a conventional type of assembly as shown in the patent to Wacker, 1,940,895, December 26, 1933. Member 23 is composed of rubber or of any material possessed of like flexible and resilient characteristics.

The member 23 is formed or molded to provide an annular opening or passageway 24 about the center thereof, as clearly indicated by the drawings. This annular opening 24 is adapted for receiving and accommodating compressed air, the latter being injected into the opening 24 of the member 23 by way of a novel valve connection represented in its entirety by 25. The member 23 is provided with a nipple or projection 26 adapted to extend through an opening 27 provided in the cooperating portion of the housing member 22. The projection 26 is provided with an opening 28 therethrough for receiving the valve mechanism 25, the latter consisting of a core member 29 adapted to receive and cooperate with a conventional valve member 31. The valve core member 29 is constructed to present a plurality of external spaced projections 32 adjacent the inner end thereof. These projections 32 extend inwardly into the wall of the opening 28 through the nipple 26 and adjacent part of the member 23 for assisting in forming a permanent integral connection between the valve core member 29 and the adjacent wall of the opening 28. This valve core member 29 is also preferably molded or vulcanized integral with the walls of the opening 28 in the member 23.

The center of the member 23 is provided with an opening 33 extending longitudinally therethrough. The center of the opening 33 is enlarged and formed to provide a seat for a connecting member 34. It can now be understood that upon injecting air under pressure into the annular opening 24 provided in the member 23 that the member 23 will be caused to grasp the member 34 with such firmness as dictated by the amount of air pressure in the annular opening 24.

The center of member 34 is provided with a longitudinal opening 20 therethrough for receiving a connecting bolt 35, the latter being adapted to extend through the cooperating lug or engine foot 15, whereby the member 34 and the engine part 15 may be clamped into rigid fixed relation. It will be noted that the member 34 is counterbored as shown at 36 for the purpose of accommodating the head 37 of the connecting bolt 35 and also that a wrench may be engaged to hold the part while the bolt is tightened.

The member 34 is formed to provide a reduced portion 38, the diameter of which is smaller than the diameter of the opening 33, extending through the main body portion or housing of the connecting means 14 in order to permit flexible movement between the member 34 and the cooperating and adjacent parts of the inner resilient member 23 and casing 22.

It will not be understood that the engine member 15 is connected to the engine bearer 10 by way of the member 34, the latter being carried by the resilient member 23 and it is now also clear that the rigidity in which the member 23 will grasp the member 34 is dependent upon the air pressure in the annular opening 24.

In order to take care of the different forces including vibrations and the like set up by an aircraft engine in the several different directions above pointed out, the several connecting means 14 (see Figure 6) carried by the ring member 10 of the engine bearer 11 may be supplied with predetermined air pressures and the entire installation graduated to meet the requirements of the particular installation.

The present connecting means is not only efficient, adjustable, flexible, pliable, and particularly adapted for the individual office for which it is intended to fill, but each of these connecting means and the several parts thereof are interchangeable, simple, durable, and comparatively light in weight.

While the present invention has been illustrated and described in connection with the mounting of one particular type of member with another, and while merely one embodiment of the invention has been illustrated and described, it is expected that those skilled in the art will now be able to readily apply the teachings of the present invention to many other and varied installations as well as change and modify the single structure here disclosed without departing from the spirit and scope of the appended claims.

I claim:

1. A flexible coupling comprising a housing, flanged resilient means supported within said housing, a tubular member projecting from said housing and having an enlarged end portion embraced by said flanged resilient means within said housing, and pneumatic means for urging said flanged resilient means into supporting engagement with said enlarged portion.

2. A coupling comprising a supporting member, a plurality of coupling devices each having a major dimension, and a supported member, means connecting said devices to said members, said major dimensions of said devices all lying in substantially the same plane, and each of said devices having a pneumatic chamber, each chamber being inflatable in the plane of said major dimension to pressures necesscry to produce an even distribution of stress from said supported member to said supporting member through said devices.

HERMAN G. KLEMM.